(12) United States Patent
He et al.

(10) Patent No.: US 9,233,345 B2
(45) Date of Patent: Jan. 12, 2016

(54) ANION TRANSPORT MEMBRANE

(71) Applicant: The Board of Trustees of the Leland Stanford Junior University, Palo Alto, CA (US)

(72) Inventors: Steve S. He, Cupertino, CA (US); Curtis W. Frank, Cupertino, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 123 days.

(21) Appl. No.: 14/179,529

(22) Filed: Feb. 12, 2014

(65) Prior Publication Data
US 2014/0227627 A1  Aug. 14, 2014

Related U.S. Application Data

(60) Provisional application No. 61/764,982, filed on Feb. 14, 2013.

(51) Int. Cl.
*B01D 71/68* (2006.01)
*H01M 8/10* (2006.01)
*B01D 69/02* (2006.01)
*B01D 71/78* (2006.01)
*B01D 71/80* (2006.01)
*C25B 13/08* (2006.01)
*B01D 71/38* (2006.01)

(52) U.S. Cl.
CPC ............... *B01D 71/68* (2013.01); *B01D 69/02* (2013.01); *B01D 71/78* (2013.01); *B01D 71/80* (2013.01); *C25B 13/08* (2013.01); *H01M 8/1027* (2013.01); *H01M 8/1032* (2013.01); *H01M 8/1072* (2013.01); *B01D 71/38* (2013.01); *B01D 2323/38* (2013.01); *B01D 2325/36* (2013.01); *B01D 2325/38* (2013.01); *Y02P 70/56* (2013.01)

(58) Field of Classification Search
CPC ........ B01D 71/68; B01D 71/78; B01D 71/80; B01D 71/38; B01D 69/02; B01D 2323/28; B01D 2325/38; H01M 8/1027; H01M 8/1032; H01M 8/1072; C08F 297/02; C08L 81/00; C25B 13/08; Y02P 70/56
USPC ................... 429/492; 525/242, 535; 204/296; 210/500.41; 521/27
See application file for complete search history.

(56) References Cited

U.S. PATENT DOCUMENTS

| 7,368,505 B2 * | 5/2008 | Mayes | ................ | C08F 265/04 521/27 |
| 2006/0089461 A1 * | 4/2006 | Mayes | ................ | C08F 265/04 525/242 |

* cited by examiner

*Primary Examiner* — Michael M Bernshteyn
(74) *Attorney, Agent, or Firm* — Lumen Patent Firm

(57) ABSTRACT

An anion transport membrane is provided enabling efficient anion exchange across the membrane, which could be used in applications like fuel cells, water electrolyzers, or water filtration systems. The structural membrane morphology is based on a hydrophobic polysulfone membrane backbone and co-grafted thereon hydrophilic poly(ethylene glycol) grafts and anion conducting quaternary ammonium species. This structure defines a bi-continuous morphology with locally phase-separated hydrophobic-hydrophilic domains, and a co-localization of the anion conducting quaternary ammonium species with respect to the hydrophilic poly(ethylene glycol) grafts enabling efficient and continuous ion transport channels for facilitating anion transport.

4 Claims, 10 Drawing Sheets

Quaternary Ammonium Polysulfone-*graft*-PEG (QA PSf-*g*-PEG)

Quaternary Ammonium Polysulfone (QA PSf)

Mesostructure

Fig. 7C

Tortuous ion transport

Fig. 7D

Quaternary Ammonium Polysulfone-*graft*-PEG (QA PSf-*g*-PEG)

Mesostructure

Fig. 8A

Ion transport channel 830  810        820

Fig. 10A  Bisphenol A Polysulfone (Udel)

Fig. 10B  Polyetheretherketone

Fig. 10C  Polyphenylsulfone (Radel)

Fig. 10D Polystyrene    Fig. 10E Polyphenylene Oxide

ANION TRANSPORT MEMBRANE

CROSS-REFERENCE TO RELATED APPLICATIONS

This application claims priority from U.S. Provisional Patent Application 61/764,982 filed Feb. 14, 2013, which is incorporated herein by reference.

FIELD OF THE INVENTION

This invention relates to anion transport membranes. In particular, an embodiment of the invention relates to amphiphilic ionomer membranes for alkaline fuel cells.

BACKGROUND OF THE INVENTION

Fuel cells are electrochemical devices designed to convert the high energy density of chemical bonds into electricity. The proton exchange membrane (PEM) fuel cell is the most prominent low-temperature fuel cell technology. These devices typically employ a polymer electrolyte membrane with pendant acidic groups as a method of transporting protons between the anode and cathode. However, the high proton concentration in PEM fuel cells creates a corrosive acidic environment in which only platinum group catalysts are stable, severely hindering commercial feasibility.

Anion exchange membrane (AEM) fuel cells, which transport hydroxide ions as opposed to protons, overcome this limitation by nature of an alkaline operating environment in which earth-abundant catalysts, such as nickel and manganese derivatives, exhibit suitable activity and stability. The AEM acts as a semipermeable separator, simultaneously transporting hydroxide anions, while preventing fuel crossover between the anode and the cathode. Slow hydroxide transport leads to significant ohmic losses, while poor fuel separation limits the cell's electrochemical potential. An ideal AEM would therefore be characterized by an efficient, percolating hydroxide transport network supported by a robust, dimensionally stable matrix.

While great strides have been made over the past decade, AEM fuel cells continue to perform unfavorably compared to PEM fuel cells. The lower performance can be partially attributed to the relatively low ionic conductivities of current AEMs, where the typical hydroxide conductivity of reported AEMs is often an order of magnitude lower than the proton conductivity of Nafion, the de facto standard commercial PEM. Thus, despite the cost advantage of AEM fuel cells, their lower performance has limited their commercial viability.

Given the high performance of PEMs, it is no surprise that their structure and chemistry have heavily influenced AEM design. As in PEMs, the general motif for synthesizing AEMs has been to attach pendant ionic salts along a robust hydrophobic polymer backbone. This approach typically manifests as aryl- or benzyl-substituted cations along an aromatic polymer chain. Whereas sulfonate is the pendant counter-anion of choice for PEMs, the pendant counter-cation in AEMs has been more varied with the aim of improving hydroxide conductivity and alkaline stability. Various approaches have involved membranes based on quaternary ammonium, imidazolium, guanidinium, phosphonium, and sulfonium cations, amongst others. Quaternary ammonium based on trimethylamine has been introduced on a variety of different polyaromatic backbones, including polysulfone, poly(phenylene oxide), and poly(etheretherketone). However, in these systems, the close proximity of the pendant cation to the rigid polymer backbone inhibits the formation of strongly segregated hydrophilic-hydrophobic domains. Consequently, these membranes are often characterized by poorly defined water-rich phases, leading to ion transport occurring in highly constricted and tortuous pathways.

The present invention addresses at least some of the current issues with exchange membranes and provides an anion transport membrane with a different morphology enabling efficient anion transport.

SUMMARY OF THE INVENTION

Micromorphology strongly influences the ion transport characteristics of a polyelectrolyte membrane. In this invention, we control the morphology of the material in such a way that facilitates hydroxide transport. In particular, we incorporate chains of poly(ethylene glycol) monomethylether) (PEG) onto a chloromethylated polysulfone backbone. The polysulfone-graft-poly(ethylene glycol) (PSf-g-PEG) copolymer is then further functionalized with anion conducting quaternary ammonium species. The idea behind this is that the hydrophilic poly(ethylene glycol) grafts will thermodynamically microphase separate from the hydrophobic polysulfone backbone. This action then leads to co-localization of the conductive quaternary ammonium species and the subsequent formation of ion transport domains within the system.

The chemistry of the process is detailed as follows. First, chloromethyl groups are grafted onto commercial polysulfone (Udel P3500 MB8) via a Friedels-Craft alkylation reaction. Poly(ethylene glycol) grafts are introduced to the chloromethylated polysulfone through a modified Williamson Ether Synthesis. Finally, the polysulfone-graft-poly(ethylene glycol) product is reacted with trimethylamine to yield the quaternary ammonium species. The weight percent and degree of grafting is dependent on several important factors:
  the degree of chloromethylation of the modified polysulfone;
  initial reagent concentrations and ratio;
  the molecular weight of the poly(ethylene glycol monomethylether) reagent; and
  the reaction time.

Our experimental tests have found that lower mass percent incorporation of the poly(ethylene glycol) grafts seems to yield the best results. In particular, our highest performance has come from 12% by mass incorporation of 750 g/mol poly(ethylene glycol monomethylether), with further optimization still to be done. We have also found that higher weight (i.e., above 40%) incorporation of the PEG component leads to a notable decrease in the in-plane conductivity. This result is based on the fact that (1) the increase in PEG content causes a concomitant decrease in the concentration of ion-conducting quaternary ammonium groups (and subsequently the ion exchange capacity), and (2) the high degree of grafting may lead to increased tortuosity in the ion transport pathway.

Embodiments of the invention can found use in a variety of applications, such as:
  1. Use as an anion-transporting semipermeable membrane in alkaline exchange membrane fuel cells.
  2. In biological applications use as a low protein adsorption material.
  3. As a semipermeable ion exchange membrane in electrodialysis and electrodeionization for water treatment and food processing.

One of the advantages of embodiments of the invention is that the majority of anion exchange polyelectrolyte membranes exhibit ionic low conductivities (~1 to 20 mS/cm). For example, typical literature values for the room temperature, inplane conductivity of various quaternary ammonium functionalized polymers are as follows: polysulfone, 10-20 mS/cm; poly(epichlorhydrin-allyl glycidyl ether), 3 mS/cm; poly(ether sulfone) cardo, 7 mS/cm; poly(ethylene-co-terafluoroethylene) 10-15 mS/cm. In contrast, the polysulfone-graft-poly(ethylene glycol) structure that we have developed can sustain 30-40 mS/cm at the same conditions, and perhaps more on further development. This value is comparable to state-of-the-art commercial anion exchange membranes, such as the Tokuyama A901, which has reported hydroxide conductivities of around 38 mS/cm.

The high conductivity of our membranes translates to better fuel cell performance when compared to its peers, notably in the reduction of ohmic polarization losses and the subsequent increase in peak power density. Our fuel cell characterization tests have shown an increase in the peak power density from 120 mW/sq cm to 180 mW/sq cm on 12% weight incorporation of PEG 750—a 50% increase.

Accordingly and in summary, the present invention provides an anion transport membrane with a hydrophobic polysulfone membrane backbone and co-grafted thereon hydrophilic poly(ethylene glycol) grafts and anion conducting quaternary ammonium species. The hydrophilic poly(ethylene glycol) grafts each could have a molecular weight ranging from about 350 to 5000 Da. The membrane has a top surface and a bottom surface and is further characterized by:
  (i) a bi-continuous morphology with locally phase-separated hydrophobic-hydrophilic domains, and
  (ii) a co-localization of the anion conducting quaternary ammonium species with respect to the hydrophilic poly (ethylene glycol) grafts, which define an ion transport channels for facilitating anion transport. The ion transport channels are continuous transport channels across the membrane and between the top and bottom surfaces of the membrane. The ion transport channels have an average diameter of about 3-30 nm defined by the average width of a hydrophilic or water-rich region separating hydrophobic or water-poor regions.

The anion transport membrane could transport anions like hydroxide, chloride, carbonate, bromide, bicarbonate, or the like. The anion transport membrane could be part of an anion exchange membrane fuel cell, a water electrolyzer (e.g. a reverse fuel cell), a water filtration system, or the like.

BRIEF DESCRIPTION OF THE DRAWINGS

FIGS. 1A-B show according to an exemplary embodiment of the invention quaternary ammonium polysulfone-graft-PEGx (QA PSf-g-PEGx, where x reflects the average molecular weight of the grafted PEG chains) (FIG. 1A).

DETAILED DESCRIPTION

Figure 1A:
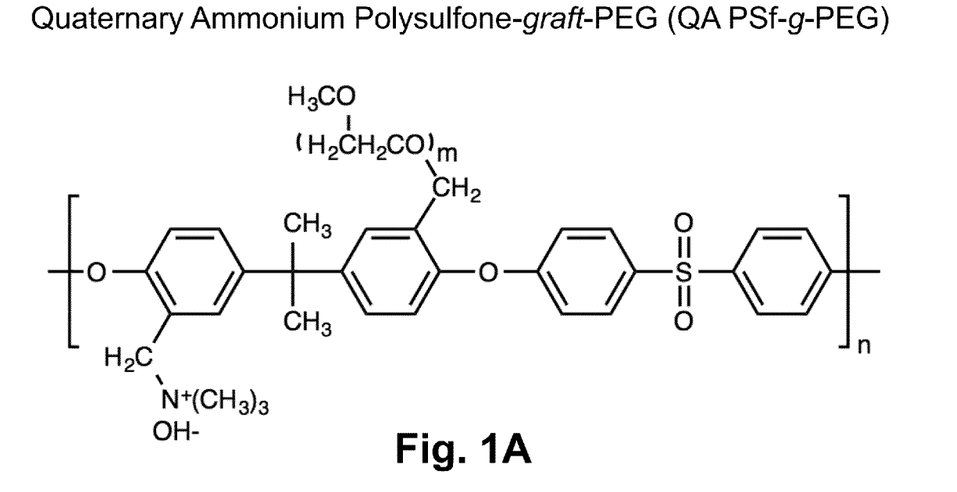
Figure 1B:
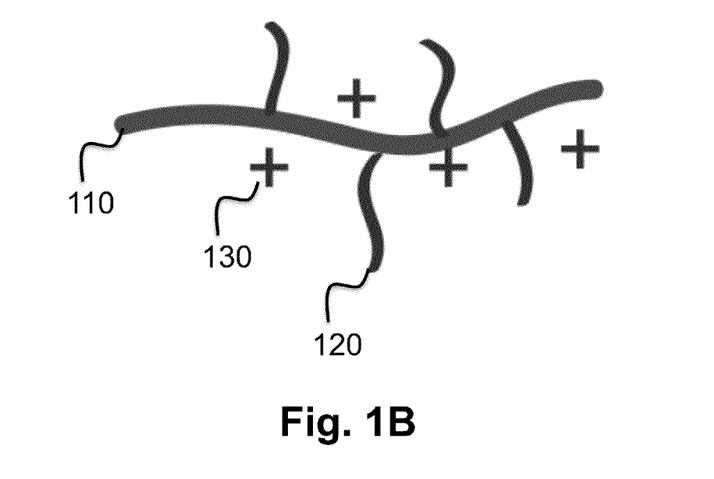
FIG. 1B shows hydrophobic polysulfone membrane backbone 110 with co-grafted thereon hydrophilic poly(ethylene glycol) grafts 120 and anion conducting quaternary ammonium species 130.

In this invention, we show that flexible, hydrophilic poly (ethylene glycol) (PEG) grafts along a typical pendant counterion-hydrophobic polyaromatic backbone ionomer can induce local phase separation and enhanced hydroxide conductivity. As an exemplary embodiment, we grafted PEG moieties along a benzyltrimethylammonium-functionalized polysulfone (QA PSf) AEM (FIGS. 1A-B). The design rationale for promoting phase separation is two-fold. First, the hydrophilic PEG graft has a repulsive x interaction parameter with the hydrophobic polysulfone backbone. Moreover, PEG's electron-rich ether groups are able to complex with cationic quaternary ammonium salts and are expected to interact favorably with the pendant benzyltrimethylammonium species along the polysulfone backbone. The culmination of these effects leads to co-localization and concentration of the quaternary ammonium groups into efficient, water-rich hydroxide transport domains, resulting in increased ionic conductivity.

The PEGylated quaternary ammonium polysulfone will be referred to as QA PSf-g-PEGx, where x=350 or 750 and reflects the molecular weight of the grafted PEG chains. In both exemplary cases, the PEG weight composition was fixed at 12%. In general, x could range from about 350 Da to 5000 Da.

Figure 2:
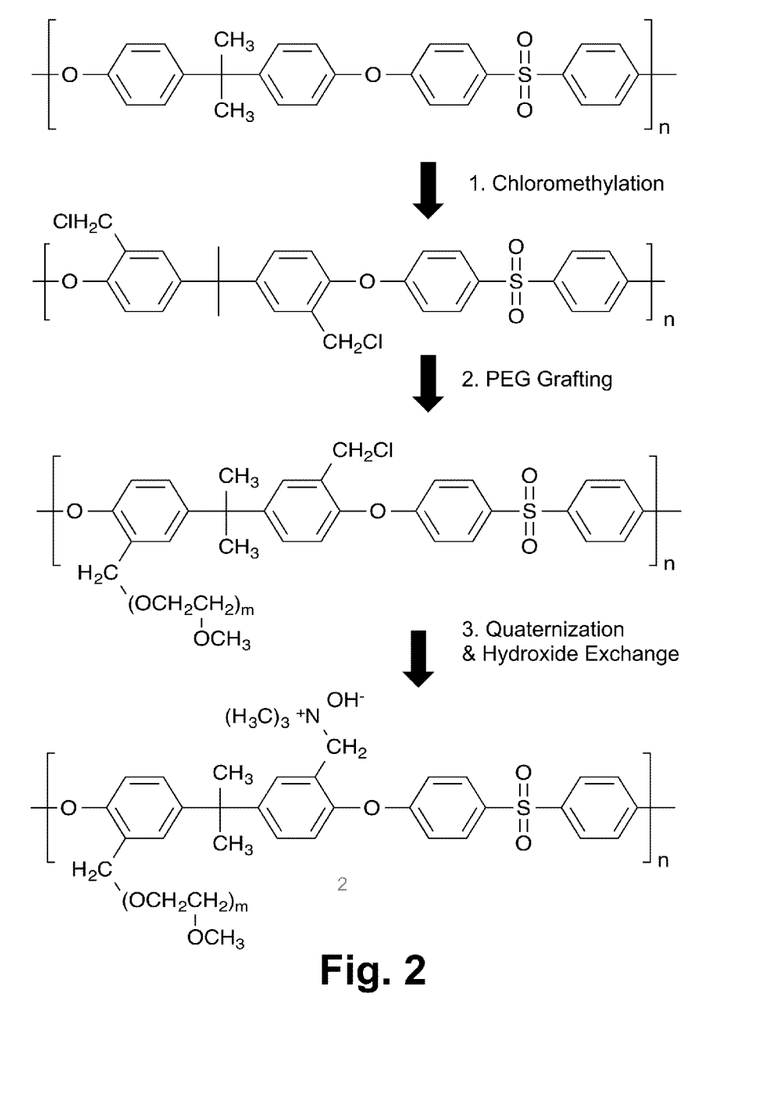
FIG. 2 shows the synthesis of QA PSf-g-PEGx follows a three-step process according to an exemplary embodiment of the invention.

Synthesis of QA PSf-g-PEGx follows a three-step process (FIG. 2 and described in more detail in section Process infra). First, chloromethyl groups are introduced along polysulfone (Udel P3500 MB8, Solvay Chemicals) following the modified Blanc Chloromethylation procedure described by Avram et al. (J. Macromol. Sci. Part A 1997, 34, 1701-1714). These labile chloromethyl groups act as the active sites for both PEGylation and quaternization with trimethylamine. PEGylation is achieved via a modified Williamson Ether Synthesis detailed by Park et al. (Biomaterials 2006, 27, 856-65). Here, PEG alkoxide is first generated by reacting PEG mono methyl ether in the presence of sodium hydroxide in THF. The alkoxide solution is then reacted with the choromethylated polysulfone to form the PEG grafts. The PEGylated polysulfone is treated with trimethylamine in DMF to yield QA PSf-g-PEGx.

Figure 3:
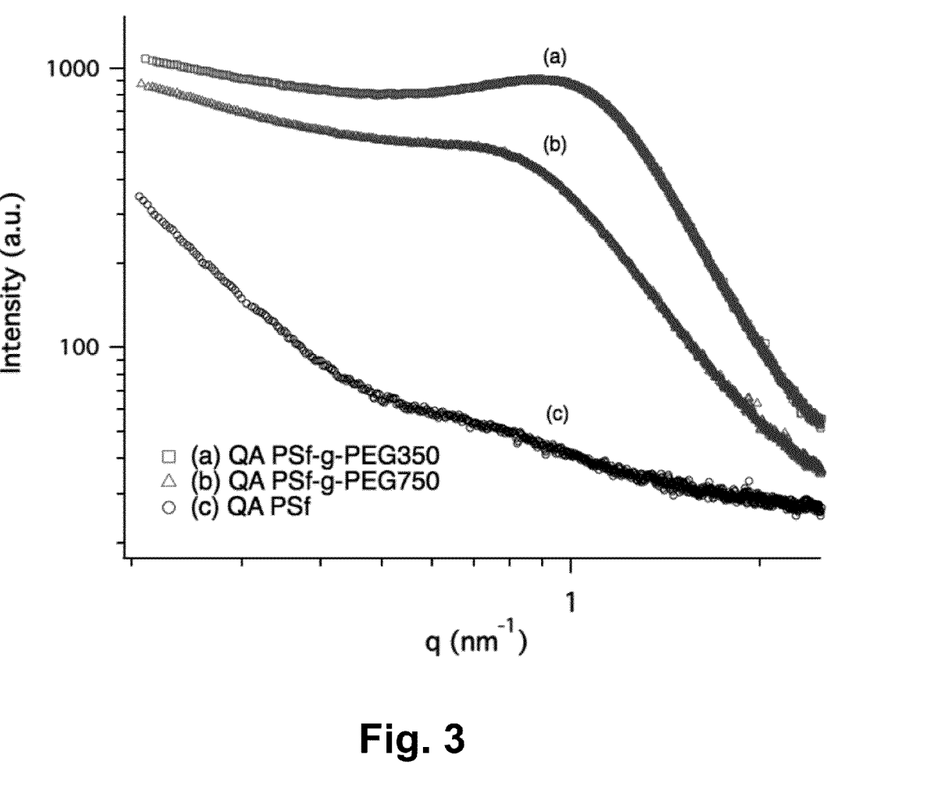
FIG. 3 shows according to an exemplary embodiment of the invention SAXS (small angle x-ray scattering) profile of hydrated AEMs. QA PSf-g-PEGx membranes exhibit scattering features absent in QA PSf, indicating that PEGylation induces nanoscale structure formation.

We performed small angle x-ray scattering (SAXS) to characterize the morphology of the PEGylated membranes. The SAXS profiles of QA PSf, QA PSf-g-PEG350 and QA PSf-g-PEG750 are shown in FIG. 3. The absence of notable scattering features for QA PSf suggests a homogeneous morphology. This result is consistent with our expectation that the short methyl linkage between the polysulfone backbone and the quaternary ammonium species inhibits strongly separated hydrophobic-hydrophilic domains. On the other hand, the introduction of PEG grafts gives rise to a broad scattering peak in the mid-q region (0.1 nm$^{-1}$ to 1 nm$^{-1}$), indicating the formation of distinct microphase separated regions. This PEGylation-induced phase-separation is attributed to the strong χ repulsion between the flexible PEG graft and the PSf backbone.

Figure 4:
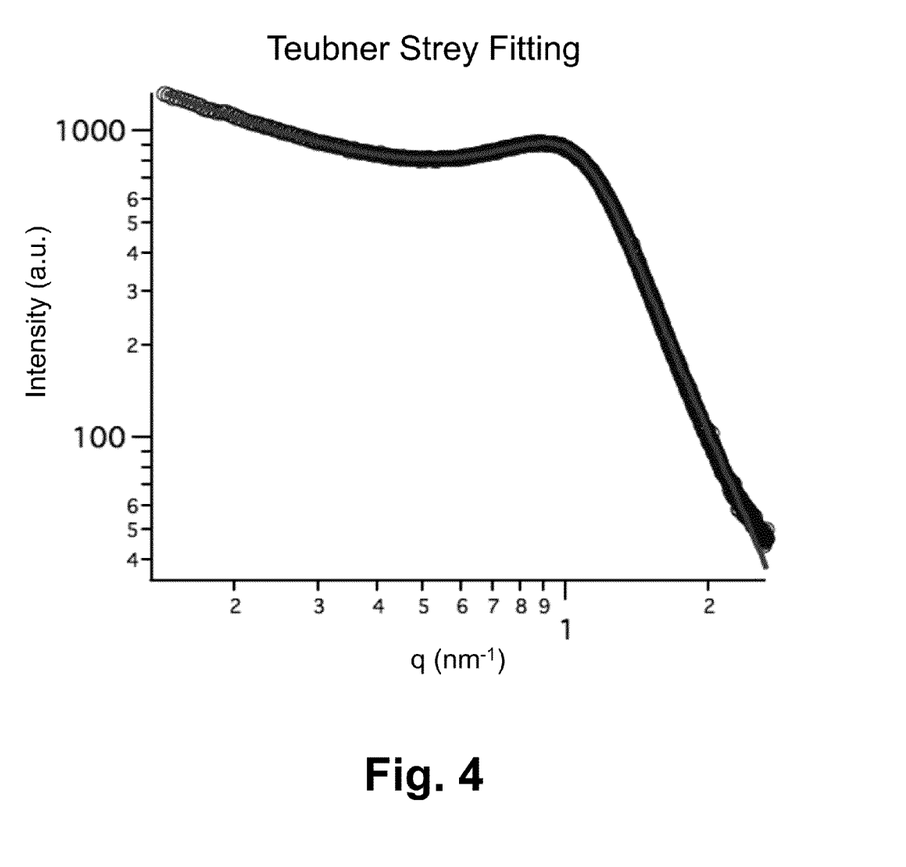
FIG. 4 shows a Teubner Strey Fitting according to an exemplary embodiment of the invention showing the existence of ion-rich, water-rich aggregates bi-continuous with a hydrophobic, water-poor matrix (i.e., ion transport channels).

The Teubner-Strey bi-continuous model was used to help elucidate the structure associated with the SAXS data. A regression fit of the structure factor proposed by this model to the QA PSf-g-PEGx scattering curves yielded excellent agreement (FIG. 4), suggesting that the QA PSf-g-PEGx membranes adopt a mesostructure characterized by a percolating ionomer network co-continuous with a hydrophobic matrix.

The two distinct length scales associated with this fit are listed in Table 1.

TABLE 1

Domain spacing d and correlation length $\xi$ from Teubner-Strey fitting of the SAXS scattering profiles. The larger d and smaller $\xi$ of QA PSf-g-PEG750 compared to QA PSf-g-PEG350 is attributed to the longer chain length of the PEG graft and decreased graft density, respectively.

|  | d (nm) | $\xi$ (nm) |
| --- | --- | --- |
| QA PSf-g-PEG350 | 6.20 | 1.93 |
| QA PSf-g-PEG750 | 7.86 | 1.63 |

Here, d is a length scale representing a quasi-periodic spacing in the pair correlation function and can be physically interpreted as the average size of an ionomer domain; is a characteristic length for correlation fall-off. The scattering data can be rationalized by the chain architecture for both QA PSf-g-PEG350 and QA PSf-g-PEG750. The larger domain size for QA PSf-g-PEG750 is ascribed to the larger contour length of the higher molecular weight PEG750 (5.8 nm) compared to PEG350 (2.8 nm). Water swelling in these hydrophilic channels results in domain sizes exceeding the contour length of the PEG grafts. Interestingly, an Alexander-de Gennes scaling analysis of the domain sizes gives a scaling exponent of −0.689 with respect to the linear graft density. This scaling behavior is very close to the theoretical exponent of −0.7 of surface-tethered real chains in a good solvent, hinting at a brush-like conformation of the PEG side-chains.

The weaker domain correlation (as manifest in the lower) of QA PSf-g-PEG750 can be explained by its lower PEG grafting density, which is roughly half that of QA PSf-g-PEG350 given the same PEG weight composition in the two systems. The larger average spacing between the PEG chains coupled with their random placement leads to decreased grafting regularity and diminished long-range interactions. This effect is again evidenced in the polydispersity of the domain sizes, as reflected by the $\xi$/d ratio, where a lower value corresponds to higher polydispersity. The ratio for QA PSf-g-PEG750 (0.20) is one-third of that of QA PSf-g-PEG350 (0.31), suggesting a broader distribution of hydrophilic domain sizes. In summary, PEGylation of QA PSf gives rise to a broad scattering feature analogous to that of a bicontinuous microemulsion. This scattering is attributed to microphase separation of hydrophilic, PEG-rich ionomer channels from the hydrophobic polysulfone matrix. Given the same weight composition, QA PSf-g-PEG350 has narrower, but less disperse domain sizes compared to QA PSf-g-PEG750.

Visual comparison between PEGylated and un-PEGylated quaternary ammonium polysulfone films showed striking macroscopic differences. The highly turbid PSf-g-PEG350 film became clear upon introduction of the benzyltrimethylammonium groups, underscoring the interaction between the PEG and the pendant quaternary ammonium ions.

Figure 5:
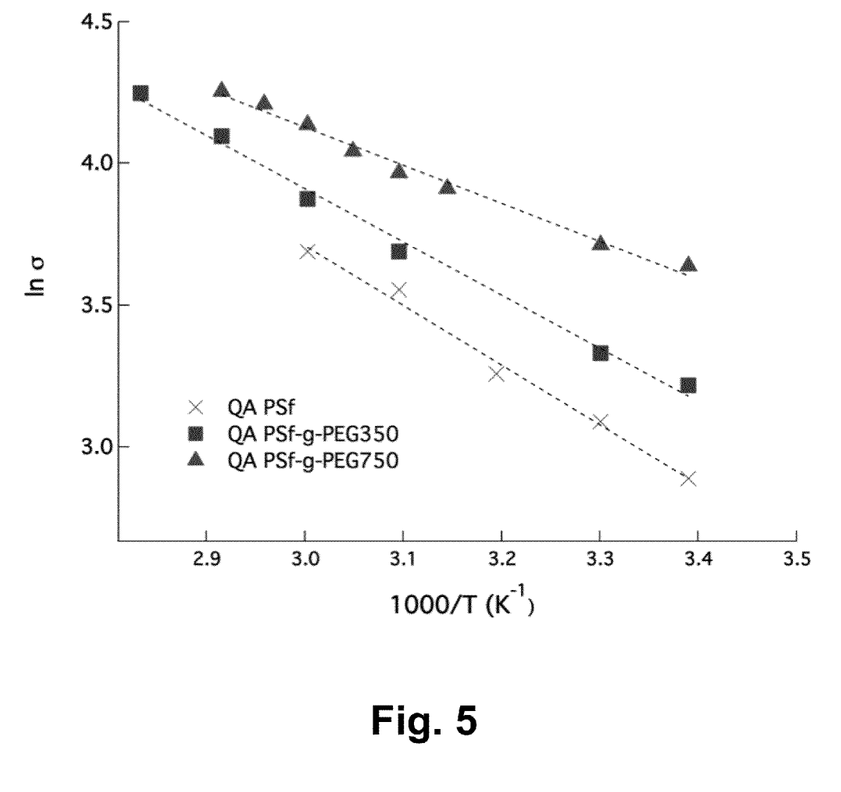
FIG. 5 shows according to an exemplary embodiment of the invention conductivity-temperature data under a water-saturated (100% RH) nitrogen stream. Dotted lines represent an Arrhenius fit. PEGylation of the polymer chains resulted in increased conductivity and lower apparent activation energies.

Hydroxide conductivity is a critical performance metric for AEMs. Four-point probe cyclic voltammetry was used to measure the in-plane conductivity. The hydroxide ions in AEMs are susceptible to conversion to carbonate and bicarbonate on exposure to atmospheric carbon dioxide. To limit $CO_2$ exposure, we performed all conductivity measurements with the membrane in a closed cell in contact with a water-saturated nitrogen stream. The temperature dependence of the in-plane hydroxide conductivity is shown in FIG. 5. The hydroxide conductivity of un-PEGylated QA PSf was 20 mS/cm at room temperature (22 degrees Celsius), consistent with previously reported data. The introduction of 12 wt. % PEG350 and PEG750 grafts increased the room temperature conductivity to 25 mS/cm and 38 mS/cm, respectively. Concomitant with the higher hydroxide conductivity was a decrease in the apparent Arrhenius activation energy, from 17.5 kJ/mol (QA PSf) to 15 kJ/mol (QA PSf-g-PEG350) and 11.2 kJ/mol (QA PSf-g-PEG750). The enhanced performance with PEGylation supports the notion that a microphase-separated structure is beneficial to ion transport.

Figure 6:
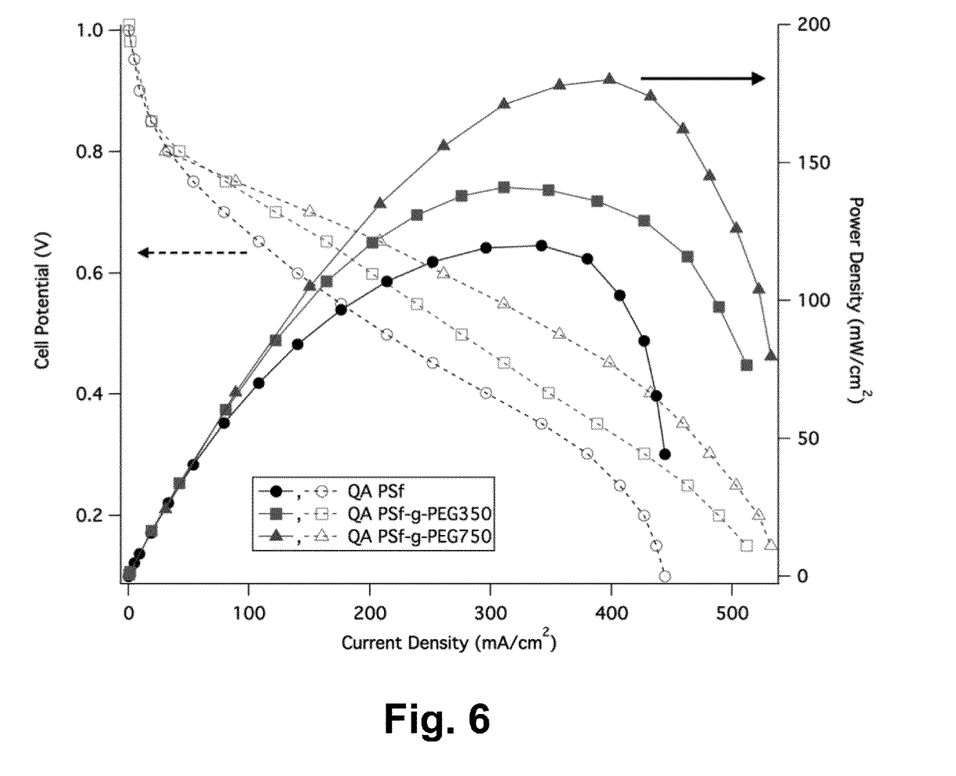
FIG. 6 shows according to an exemplary embodiment of the invention polarization (left vertical axis) and power density (right vertical axis) curves comparing MEA performance at 60 degrees Celsius cell temperature and 100% relative humidity. Anode: 0.5 mg/cm$^2$ Pt/C (TKK TEC10E50E) and 200 cm$^3$/min O$_2$ flow rate. Cathode: 2 mg/cm$^2$ PtIr/C (ETEK) and 150 cm$^3$/mm H$_2$ flow rate.

Membrane electrode assemblies (MEAs) using the PEGylated membranes were fabricated to assess prototypical fuel cell performance. Although the ultimate goal for AEMs would be to utilize non-precious metal catalysts, the MEA tests were carried out using commercially available Pt/C and PtIr/C at the anode and cathode, respectively, to enhance reproducibility and offer literature comparability. Fuel cell performance, as characterized by the polarization and power density curves (FIG. 6), mirrors the enhanced conductivity of the PEGylated polymers. The introduction of PEG grafts showed a notable improvement in the peak power density and maximum current density.

We attribute the increased conductivity and device performance to the local heterogeneity afforded by the PEG grafts. These flexible side chains lead to a bi-continuous morphology characterized by locally phase-separated hydrophobic-hydrophilic domains. In contrast to QA PSf's homogeneous architecture, the quaternary ammonium species in both QA PSf-g-PEG350 and QA PSf-g-PEG750 are now concentrated into more efficient ion transport domains. The higher performance of QA PSf-g-PEG750 over QA PSf-g-PEG350 is ascribed to larger ion transport channels (via domain size d), leading to a less tortuous diffusion pathway.

The structural influence on the enhanced performance is underscored by comparing the ion exchange capacities of the materials. The gravimetric ion exchange capacity (IEC) reflects an ionomer's mass charge density, expressed here in mmol hydroxide ions per gram of dry polymer. The theoretical IEC was determined by $^1$H NMR and was corroborated by experimental back titration (Table 2). Of particular interest is that the PEGylated membranes have lower IECs than QA PSf. While a decrease in IEC typically manifests in decreased ionic conductivity as a result of lower charge content, both QA PSf-g-PEG350 and QA PSf-g-PEG750 show increased hydroxide conductivities and device performance. Hydroxide conductivity normalized by the IEC has been used as a qualitative metric for assessing ion transport efficacy and is presented in Table 2. PEGylation increases the IEC normalized conductivity by 67% and 122% for QA PSf-g-PEG350 and QA PSf-g-PEG750, respectively, highlighting the influence of structure formation on ion transport properties.

TABLE 2

| | IEC$^{(a)}$ | $\sigma^{(b)}$ | $\sigma_{norm}^{(c)}$ |
|---|---|---|---|
| QA PSf | 2.08 (1.98) | 20 | 10 |
| QA PSf-g-PEG350 | 1.56 (1.32) | 25 | 19 |
| QA PSf-g-PEG750 | 1.78 (1.57) | 38 | 24 |

$^{(a)}$IEC [mmol g$^{-1}$] determined by NMR and back-titration (in parentheses).
$^{(b)}$Conductivity [mS cm$^{-1}$] at 22 degrees Celsius.
$^{(c)}$Conductivity at 22 degrees Celsius normalized against titrated IEC values [mS g cm$^{-1}$ mmol$^{-1}$].

The design objective of this invention was to induce the formation of water-rich ion transport domains and we have demonstrated that grafting hydrophilic poly(ethylene glycol) chains along a benzyltrimethylammonium polysulfone AEM can promote nanoscale hydrophobic-hydrophillic domain formation. Colocalization of the ion conducting quaternary ammonium moieties as a result of this phase separation results in more efficient hydroxide transport as demonstrated by increased in-plane conductivity and device performance.

QA PSf versus QA PSf-g-PEG

A structural comparison between quaternary ammonium polysulfone (QA PSf) and quaternary ammonium polysulfone grafted poly(ethylene glycol) (QA PSf-g-PEG) provides further insight in how a change in micromorphology strongly influences the ion transport characteristics of a polyelectrolyte membrane.

Figure 7A:
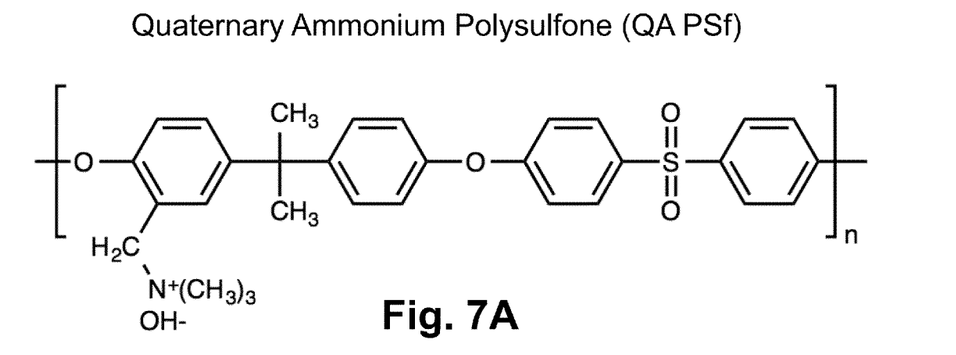
FIGS. 7A-D show quaternary ammonium polysulfone (QA PSf, FIGS. 7A-B) with a mesostructure (FIG. 7C) defined by very poor phase separation between the charged (+), ion conducting quaternary ammonium groups and the polysulfone backbone (710) (evidenced by the lack of a scattering peak in the SAXS data). This structure leads to tortuous, inefficient ion (−) transport pathways and lower anionic conductivities (FIG. 7D).
Figure 7B:
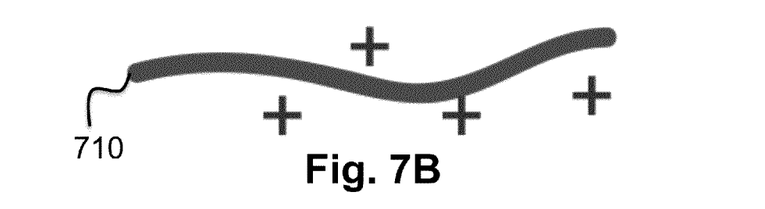
Figure 7C:
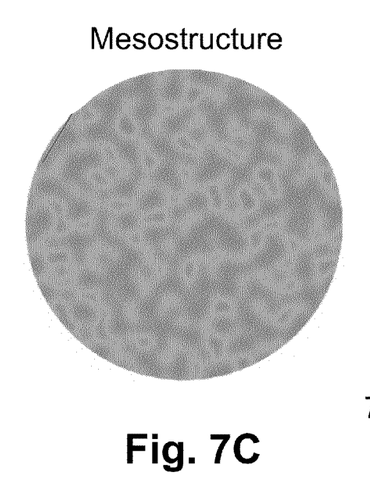
Figure 7D:
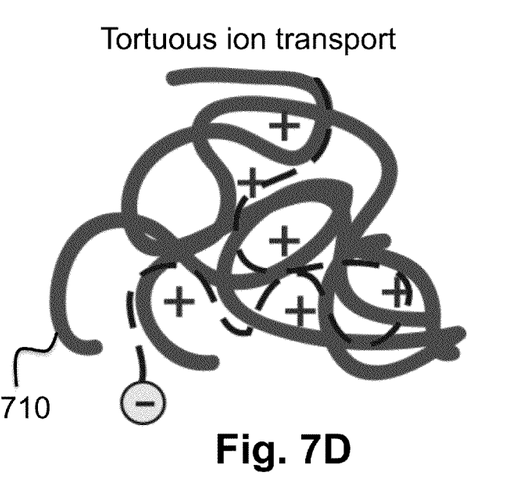

The mesostructure of QA PSf (FIGS. 7A-D) is defined by very poor phase separation between the charged (+), ion conducting quaternary ammonium groups and the polysulfone backbone 710, which evidenced by the lack of a scattering peak in the SAXS data (FIG. 3). This leads to a tortuous (i.e. maze-like), inefficient ion (−) transport pathways and lower anionic conductivities as shown in FIG. 7D.

Figure 8A:
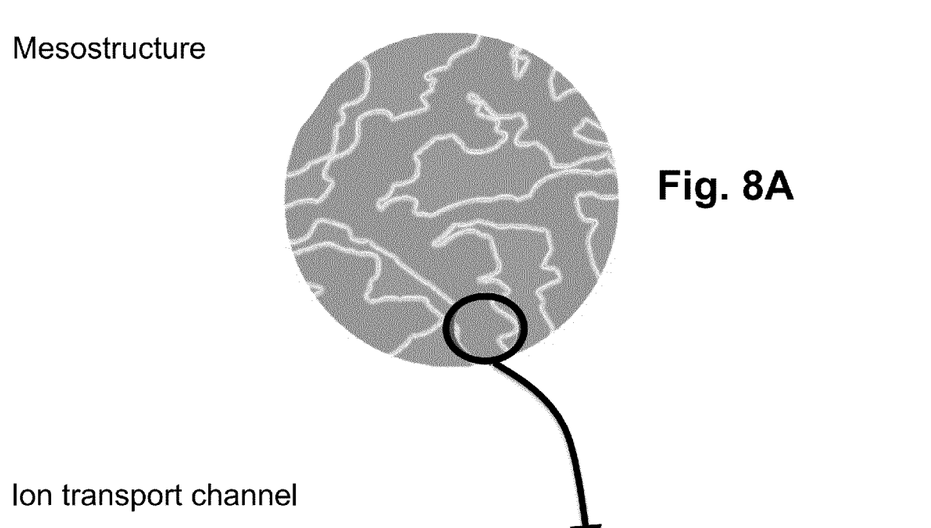
FIGS. 8A-B show according to an exemplary embodiment of the invention a mesostructure of quaternary ammonium polysulfone-graft-PEG (FIG. 8A) and ion transport channels (FIG. 8B).
Figure 8B:
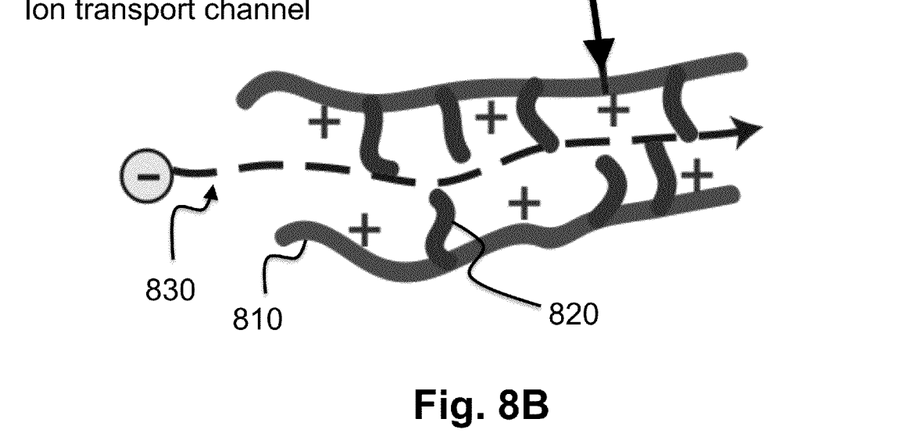
Figure 9:
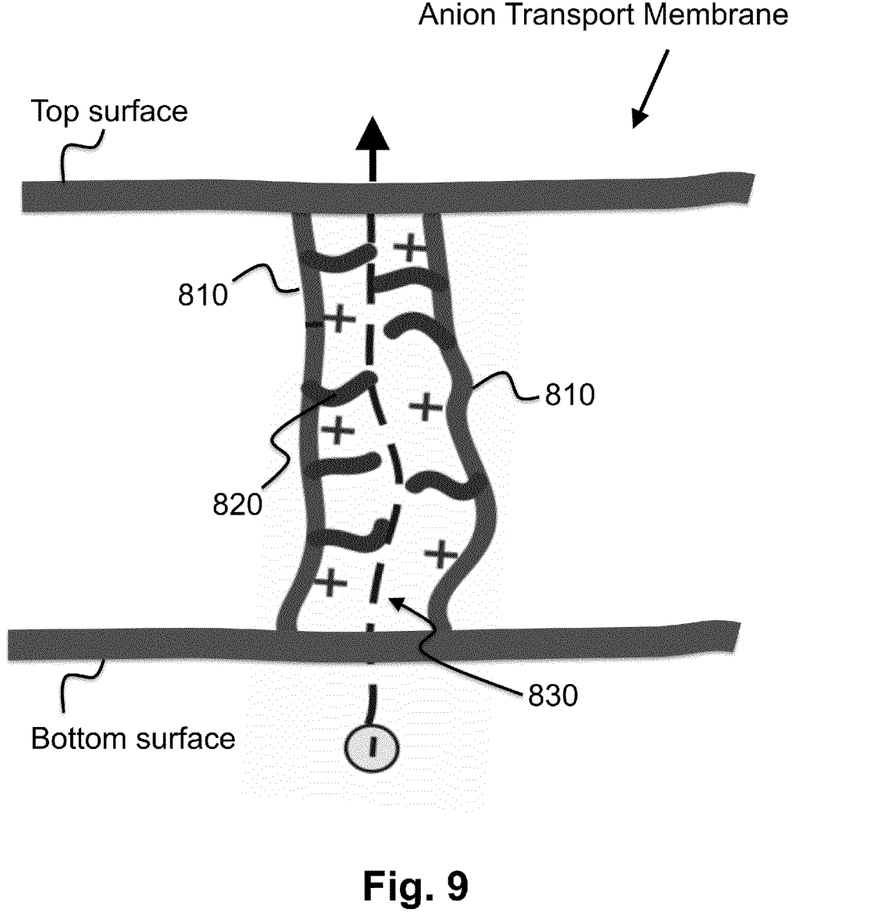
FIG. 9 shows an anion transport membrane according to an exemplary embodiment of the invention with a top surface and a bottom surface and the ion channel as a continuous channel across the anion transport membrane between both surfaces. The average diameter of the ion transport channels is about 3-30 nm, whereby the average diameter is obtained from, for example, but not limited to, SAXS measurements. The average diameter of the ion transport channels is defined by the average width of a hydrophilic or water-rich region separating hydrophobic or water-poor regions.

In contrast as shown in FIG. 8A-B, QA PSf-g-PEG have ion-rich channels (830) facilitate hydroxide (−) transport. The ion channels create a continuous path between a top and bottom surface of an anion transport membrane (FIG. 9). The ion channels have approximately an average 3-30 nm in diameter from SAXS data (FIG. 3). The diameter is defined by the average width of a hydrophilic or water-rich region separating hydrophobic or water-poor regions. The thermodynamics of the system coupled with the brush-like conformation of the PEG grafts (820) causes the formation of these channels. The charged quaternary ammonium species (+) are localized and concentrated to these channels (830), creating an "ionic highway" supported by the polysulfone (810) matrix as shown in FIG. 8B. The result of this unique mesostructure (FIG. 8A-B) is more efficient ion transport compared to for example QA PSf. This is demonstrated by the fact that QA PSf-g-PEGx exhibits higher conductivity at lower charge content ("ion exchange capacity", or IEC) compared to QA PSf. The decrease in IEC or charge density is due to two reasons. First, from a charge perspective, because both quaternization and PEGylation occur on the same reaction site, an increase in PEG content necessarily limits how much ion-conducting quaternary cations can be placed along the polysulfone backbone. Second, from a mass perspective, as the IEC is defined as charge per unit mass [mEq/g], PEGylation causes an increase in mass due to the higher molecular weights of PEG compared to quaternary ammonium. Both of these combine to lower the IEC. It should be noted that it is not clear and it would certainly not be expected a priori that the random grafting of PEG with QA onto the same backbone will give the mesostructure (FIGS. 8A-B). Hence, it is not clear and it would certainly not be expected that this combination would give better performance. In fact, one might expect the opposite to be true, as a decrease in IEC typically translates to decreased conductivities.

The mesostructure of QA PSf-g-PEG is not seen for QA PSf or PSf-g-PEG. PSf-g-PEG by itself exhibits micron-scale macrophase separation as the chains are no longer locally stabilized by the charged groups. Hence, the presence of both QA and PEG are necessary as they exhibit a synergistic effect in creating the ion transport channels. Moreover, the lack of charged species in PSf-g-PEG makes the un-quaternized system un-conductive.

In the case of PSf-g-PEG, the lack of charged species (e.g., quaternary ammonium) makes this system un-suitable for ion exchange membranes by itself as the ion transport kinetics would be far too low.

Variations

Figure 10A:
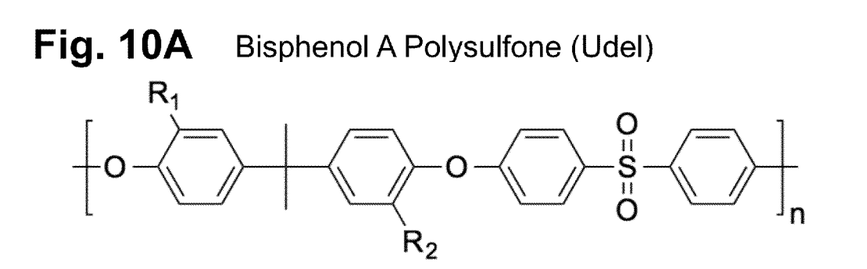
FIGS. 10A-E show examples of hydrophobic aromatic backbones according to the invention.

So far we described bisphenol-A polysulfone backbone with co-grafted PEG and quaternary ammonium species. The structure could be generalized as shown in FIG. 10A with bisphenol A polysulfone (Udel) as the backbone and co-grafted R1 and R2 groups.

R$_1$ could be: hydrogen,

—CH$_2$—N$^+$R$_3$R$_4$R$_5$, or

—CH$_2$—O—(CH$_2$CH$_2$O)$_m$—CH$_3$

R$_2$ could be: Hydrogen,

—CH$_2$—N$^+$R$_3$R$_4$R$_5$, or

—CH$_2$—O—(CH$_2$CH$_2$O)$_m$—CH$_3$ m could be about 7 (for 350 Da PEG) up to about 45 (for 2000 Da PEG) R$_3$,R$_4$,R$_5$ can be any carbon side chain, typically ranging from C$_1$ to C$_{20}$. In one of examples described herein they are —CH$_3$.

Figure 10B:
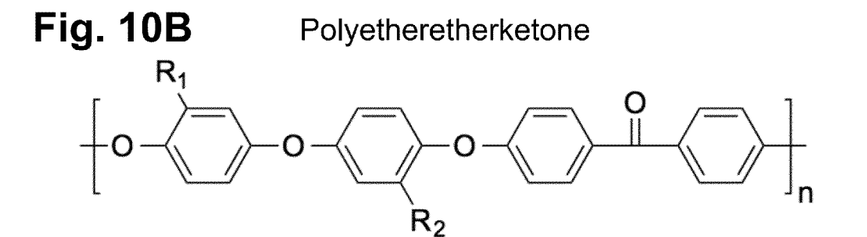
Figure 10C:
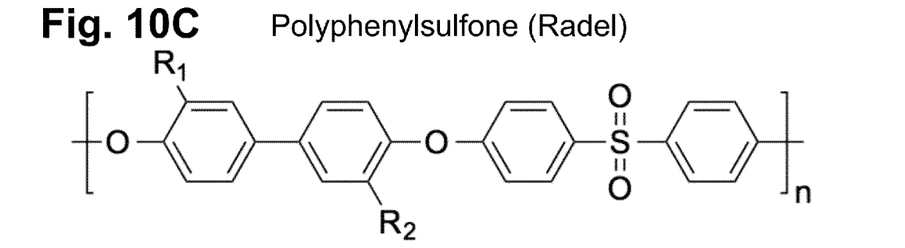
Figure 10D:
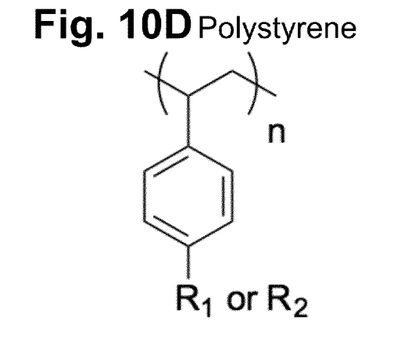
Figure 10E:
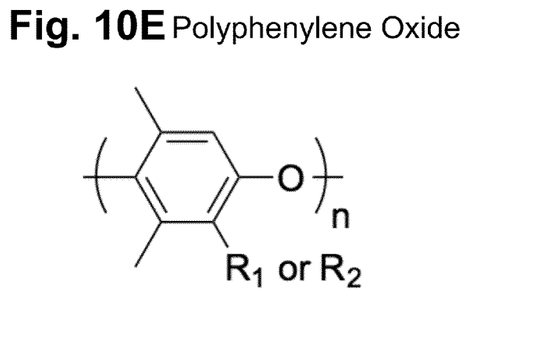

The actual chemical identity of R$_1$ and R$_2$ could be randomly selected from the above lists for each repeating unit of the polymer. For example, suppose the polymer is made of about 150 repeat units (n=150) and we introduce an index i describing the specific monomer along the chain, where i ranges from 1 (the first monomer at the beginning of the chain) to n=150 (the last monomer at the end of the chain). Then, for i=1 R$_1$ might be PEG and R$_2$ hydrogen; for i=2 R$_1$ might be quaternary ammonium and R$_2$ might be PEG, with varying permutations up to i=n. It is noted that the synthesis described herein could be extended to various other hydrophobic aromatic backbones with possible performance enhancements such as polyetheretherketone (FIG. 10B), polyphenylsulfone (Radel) (FIG. 10C), polystyrene (FIG. 10D) or polyphenylene oxide (FIG. 10E). The phenyl linkages in unmodified polysulfone exhibit low rotational hindrance, consequently imparting high flexibility to the polymer. Using a more rigid polymer backbone could therefore lead to different phase behavior and morphology, consequently affecting performance.

The embodiments described herein could also be varied accordingly to the following examples.

1. Incorporate as Block Copolymer. Amphiphilic block copolymers are known to phase separate into precise structures at the nano- and micro-scales. This thermodynamically driven self-assembly process is directly linked to the volume fractions of the constituent blocks. Here, we would be able to control the volume fractions of the PEG and quaternary ammonium polysulfone blocks in an effort to optimize the ion transport morphology.
2. Alternative Grafted Side Chain. In lieu of poly(ethylene glycol), one can imagine grafting an alternative hydrophilic sidechain (e.g., poly(vinyl alcohol)). The nature of the side-group can significantly influence the behavior of the system from a polymer physics perspective. For example, incorporating a bulkier graft would hinder the rotational freedom of the polymer, leading to a stiffer backbone and different aggregation behavior. PEG complexes with quaternary ammonium cations. Accordingly, an alternative membrane without such complexing behavior may yield different morphologies.
3. Alternative Ion Conductor. Alternative species such as quaternary phosphonium and guanidinium could be used instead of quaternary ammonium.

Process

Chloromethylation of Polysulfone

Udel P3500 MB8 polysulfone was used as provided by Solvay Chemicals. Chlorotrimethylsilane (42.5 mL) and paraformaldehyde (10.0 g) were added to round-bottom flask containing a polysulfone solution (14.88 g polysulfone in 750 mL of chloroform). After 30 minutes of mixing, stannic chloride (0.392 mL) was added dropwise to the reaction solution. The reaction flask was then fitted with a reflux condenser and heated to 50 degrees Celsius in a silicone oil bath, and the reaction was stirred for 60 to 72 hours, depending on the desired degree of substitution. Upon completion, excess reagents were filtered out and the filtrate was precipitated into ethanol in a 3:1 ratio of ethanol to filtrate. The precipitate was washed with excess ethanol and collected as a white powder. The powder was redissolved in choloroform, repurified following the precipitation process just described, and vacuum dried at room temperature for 24 hours.

PEGylation

A typical PEGylation reaction is described as follows. In a nitrogen glove bag, 1.6 mmol of sodium hydride (60 wt % suspension in mineral oil) was first dissolved in THF at a concentration of 0.01 g/mL, and then added to a 25 wt % poly(ethylene)glycol monomethylether (1.2 mmol) solution in THF. The reaction was allowed to proceed for 2 hours with stirring, after which it was added dropwise to a solution of chloromethylated polysulfone (1.0 g of DS 1.05 in 20 mL THF). The solution was reacted for 20.5 hours at room temperature under nitrogen, and then precipitated into a 3:1 mixture of petroleum ether to ethanol. The precipitate was collected by vacuum filtration and used immediately.

Quaternization

Quaternary ammonium polysulfone-graft-poly(ethylene glycol) (QA PSf-g-PEGx) was synthesized by in situ quaternization of trimethylamine. Specifically, trimethylamine (4.6M in ethanol) was added dropwise to a solution of either chloromethylated polysulfone or polysulfone-graft-poly(ethylene glycol) (1 g in 10 mL DMF) at 3× molar excess. The reaction mixture was stirred under ambient conditions for 48 hours, and then filtered onto a 3 in×2 in glass slide. The polymer-coated slide was then placed in vacuum for 48 hours at room temperature to cast a thin film. The film was removed in water and pretreated by soaking it in a 1M potassium hydroxide (KOH) solution for 24 hours. Following the KOH treatment, the film was thoroughly rinsed with DI water until the pH of the wash stabilized and used immediately to prevent extensive conversion of the hydroxide anions to carbonate/bicarbonate.

Electrode Preparation

Catalyst ink for electrode fabrication was prepared by combining 11 mg of Pt/C (TKK TEC10E50E) and 26 uL ionomer (Fumion FAA-3) in 413 uL of a 40% water 60% isopropanol solution. The ink was sonicated for 10 minutes at room temperature and then painted onto 5 cm$^2$ squares of graphite paper (Sigracet GDL35 BC) to a loading of 0.5 mg/cm$^2$ for both anode and cathode. The membrane electrode assembly was prepared by sandwiching the ionomer film between the anode and cathode in the fuel cell testing fixture, with teflon gaskets (0.25 mm thick) at both electrodes to prevent puncturing by the serpentine flow channels.

Composition Examples

The following composition ranges produce functioning membranes within the spirit of the invention. The overall degree of chloromethylation (DCM) could be 0.3 to 1.5 (which is the average number of methyl chlorides per repeat unit). The percentage PEGylation (out of overall DCM) could be about 5% to 75%. The percentage of quaternary ammonium (out of overall DCM) could be about 25% to 95%. Mn PEG could be about 350 Da up to 5000 Da.

The specific example of QA PSf-g-PEG350 described herein had the following composition:

PEG Mn 350 Da
Overall DCM: 1.1
% PEGylation: 18%
% QA: 82%

The specific example of QA PSf-g-PEG750 described herein had the following composition:

Peg Mn 750 Da
Overall DCM: 1.1
% PEgylation: 9%
% QA: 91%

What is claimed is:

1. An anion transport membrane, comprising:
a hydrophobic polysulfone membrane backbone with co-grafted thereon hydrophilic poly(ethylene glycol) grafts and anion conducting quaternary ammonium species, wherein the membrane has a top surface and a bottom surface, and wherein the membrane comprises:
(i) a bi-continuous morphology with locally phase-separated hydrophobic-hydrophilic domains, and
(ii) a co-localization of the anion conducting quaternary ammonium species with respect to the hydrophilic poly(ethylene glycol) grafts, therewith having defined ion transport channels for facilitating anion transport, wherein the ion transport channels are continuous hydrophilic water-attracting ion transport channels across the membrane and between the top and bottom surfaces of the membrane, and wherein the ion transport channels have a diameter of from 3 to 30 nm defined by a width of the hydrophilic region separating hydrophobic regions.

2. The anion transport membrane as set forth in claim 1, wherein the anion is hydroxide, chloride, bromide, carbonate, or bicarbonate.

3. The anion transport membrane as set forth in claim 1, wherein the hydrophilic poly(ethylene glycol) grafts each have a molecular weight ranging from 350 to 5000 Da.

4. The anion transport membrane as set forth in claim 1, wherein the anion transport membrane is part of an anion exchange membrane fuel cell, a water electrolyzer, or a water filtration system.

* * * * *